US012305924B2

(12) United States Patent
Ott

(10) Patent No.: US 12,305,924 B2
(45) Date of Patent: May 20, 2025

(54) METHOD AND APPARATUS FOR HARDENING MOLD GRIDS USING CLAMP QUENCHING

(71) Applicant: Columbia Machine, Inc., Vancouver, WA (US)

(72) Inventor: Josef Ott, Hagerstown, MD (US)

(73) Assignee: Columbia Machine, Inc., Vancouver, WA (US)

( * ) Notice: Subject to any disclaimer, the term of this patent is extended or adjusted under 35 U.S.C. 154(b) by 519 days.

(21) Appl. No.: 17/567,441

(22) Filed: Jan. 3, 2022

(65) Prior Publication Data

US 2023/0213282 A1 Jul. 6, 2023

(51) Int. Cl.
*F27B 9/24* (2006.01)
*C21D 1/63* (2006.01)
(Continued)

(52) U.S. Cl.
CPC .................. *F27B 9/24* (2013.01); *C21D 1/63* (2013.01); *C21D 1/673* (2013.01); *C21D 9/0018* (2013.01);
(Continued)

(58) Field of Classification Search
CPC .... F27B 9/24; F27B 9/02; F27B 9/045; F27B 2009/026; F27B 2009/124; C21D 9/0062; C21D 1/63; C21D 1/673; C21D 9/0018; C21D 9/0025; F27D 2005/0093; F27D 2007/063; F27D 2009/0081; F27D 2009/0089; F27D 5/0012; F27D 5/0018; F27D 2003/0012; F27D 2099/0096
See application file for complete search history.

(56) References Cited

U.S. PATENT DOCUMENTS 3,599,946 A * 8/1971 Westeren ............... C21D 1/773
266/132
2019/0300975 A1* 10/2019 Hill .......................... C21D 1/70
(Continued)

FOREIGN PATENT DOCUMENTS

EP 1191111 A1 * 3/2002 ............. C21D 1/673
WO WO-9907903 A1 * 2/1999 ........... C21D 9/0018
WO WO-2017180193 A1 * 10/2017

OTHER PUBLICATIONS

GMM_concrete_block_and_paving_stone.pdf (Year: 2018).*

*Primary Examiner* — Steven S Anderson, II
*Assistant Examiner* — Kurt J Wolford
(74) *Attorney, Agent, or Firm* — Schaffer IP Law, LLC

(57) ABSTRACT

A method and apparatus for treating a workpiece such as a mold grid includes moving the workpiece laterally along a conveyor assembly into a furnace for heating in a carbon-rich atmosphere to form a heated workpiece. The heated workpiece is then received from the furnace onto the conveyor assembly in an enclosed vestibule whereupon it is clamped under pressure between an overhead mechanical press and the conveyor assembly to form a clamped assembly. The clamped assembly, including a portion of the conveyor, is then lowered into a quenching bath via an elevator assembly until the heated workpiece is quenched, whereupon the clamped assembly is raised out of the bath and the clamping force released. This clamping during quenching acts to maintain the workpiece in a planar orientation while reducing warpage during the quenching process.

19 Claims, 11 Drawing Sheets

(51) Int. Cl.

| | |
|---|---|
| ***C21D 1/673*** | (2006.01) |
| ***C21D 9/00*** | (2006.01) |
| ***F27B 9/02*** | (2006.01) |
| ***F27B 9/04*** | (2006.01) |
| ***F27B 9/12*** | (2006.01) |
| ***F27D 3/00*** | (2006.01) |
| ***F27D 5/00*** | (2006.01) |
| ***F27D 7/06*** | (2006.01) |
| ***F27D 9/00*** | (2006.01) |
| ***F27D 99/00*** | (2010.01) |

(52) U.S. Cl.

CPC ......... *C21D 9/0025* (2013.01); *C21D 9/0062* (2013.01); *F27B 9/02* (2013.01); *F27B 9/045* (2013.01); *F27D 5/0012* (2013.01); *F27D 5/0018* (2013.01); *F27B 2009/026* (2013.01); *F27B 2009/124* (2013.01); *F27D 2003/0012* (2013.01); *F27D 2005/0093* (2013.01); *F27D 2007/063* (2013.01); *F27D 2009/0081* (2013.01); *F27D 2009/0089* (2013.01); *F27D 2099/0096* (2013.01)

(56) References Cited

U.S. PATENT DOCUMENTS

| | | | | |
|---|---|---|---|---|
| 2021/0018268 | A1* | 1/2021 | Park | F27B 21/00 |
| 2024/0093321 | A1* | 3/2024 | Armuth | C21D 1/773 |

* cited by examiner

METHOD AND APPARATUS FOR HARDENING MOLD GRIDS USING CLAMP QUENCHING

BACKGROUND OF THE INVENTION

1. Field of the Invention

The present invention relates to an assembly and method for heat-treating articles and, more particularly, to methods and apparatuses for hardening mold-grids by clamping to prevent warping during the carburization and/or a quenching process.

2. Description of the Prior Art

Mold grids are sized and shaped with one or more mold cavities to form molded concrete products such as pavers, landscape products, curb stones, and retaining wall stones. These mold grids are typically constructed of a one-piece metal structure that include multiple openings that define the shape of the molded concrete products extruded from the mold grids.

Since it is desirable to form consistently shaped molded products over repeated uses, manufacturers have learned that it is important that these mold grids be constructed to be as rigid as possible so that they do not flex, warp, or wear unevenly over repeated use. Thus, it has been proposed that these mold grids be formed of steel and hardened by heating the grid in a furnace in a carbon-rich atmosphere. The resulting carbon steel mold grids would then better maintain their shape over repeated use over untreated grids.

Currently, the mold grids are heated to 1700 degrees Fahrenheit in a furnace and then manually lowered into a quenching bath of oil to quickly bring the temperature down and create a martensitic structure within the steel surface that is super-saturated with carbon content. A drawback to this method is that this process often results in a warping of the mold grid by up to 10 mm. This exceeds the desired variation of the mold grid of 0.5 mm over a 1000 mm distance.

Existing processes for correcting this warping have significant drawbacks. To reform the mold grid back into tolerance, the mold grid is typically mechanically straightened via hydraulic press. This process must be completed within a short time period after it has been hardened. Additionally, the flatness may oftentimes need to be improved via machining or by grinding. Grinding requires that the hardened carbonized martensitic surface be removed first until it is planar, thus thinning the mold surfaces and reducing the enhanced useable life of the mold grid. Similarly, bending requires the use of a specialized press that can weaken the steel and subject it to microfractures. These hairline cracks will eventually migrate through the entire mold insert due to the high dynamic loads it is exposed to.

Accordingly, the need arises for a more efficient and effective process for hardening a mold grid for repeated use over the lifetime of the mold grid.

SUMMARY OF THE INVENTION

A method and apparatus for treating a workpiece such as a mold grid includes moving the workpiece laterally along a conveyor assembly into a furnace for heating in a carbon-rich atmosphere to form a heated workpiece. The heated workpiece is then received from the furnace onto the conveyor assembly in an enclosed vestibule whereupon it is clamped under pressure between an overhead mechanical press and the conveyor assembly to form a clamped assembly. The clamped assembly, including a portion of the conveyor, is then lowered into a quenching bath via an elevator assembly until the heated workpiece is quenched, whereupon the clamped assembly is raised out of the bath and the clamping force released. This clamping during quenching acts to maintain the workpiece in a planar orientation while reducing warpage during the quenching process.

Also described is an assembly for quenching a heated workpiece in a quenching bath according to teachings of the invention. The assembly includes a lower conveyor configured to receive a heated workpiece laterally onto a lower conveyor support surface at a receiving level. An upper anvil is positioned above the lower conveyor support surface to form a space for receiving the heated workpiece therebetween. A press is coupled to the upper anvil and configured to move the upper anvil downward toward the lower conveyor to thereby clamp the heated workpiece in a clamped position between the upper anvil and lower conveyor. An elevator assembly is configured to lower the lower conveyor from the receiving level to a quenching level into a quenching bath together with the heated workpiece and upper anvil when the heated workpiece is in the clamped position so that the heated workpiece is quenched and forms a quenched workpiece.

More specifically, the new method and apparatus minimize the warping problem from previously-used methods by applying a hydraulic press to the mold grid as it comes out hot from the furnace and continually clamping the mold grid(s) between the hydraulic press and tray resting on the conveyer as the mold grid is lowered into the oil quenching bath and throughout the quenching process. Applicant refers to this process of clamping between an overhead anvil and the conveyor structure during the quenching process as "clamp quenching." Under clamp quenching, the mold grid is lowered by a vertically moveable section of the conveyor that is structurally reinforced to deal with the extra pressure from the hydraulic press.

The foregoing and other objects, features and advantages of the invention will become more readily apparent from the following detailed description of a preferred embodiment of the invention that proceeds with reference to the accompanying drawings.

DETAILED DESCRIPTION

Figure 1:
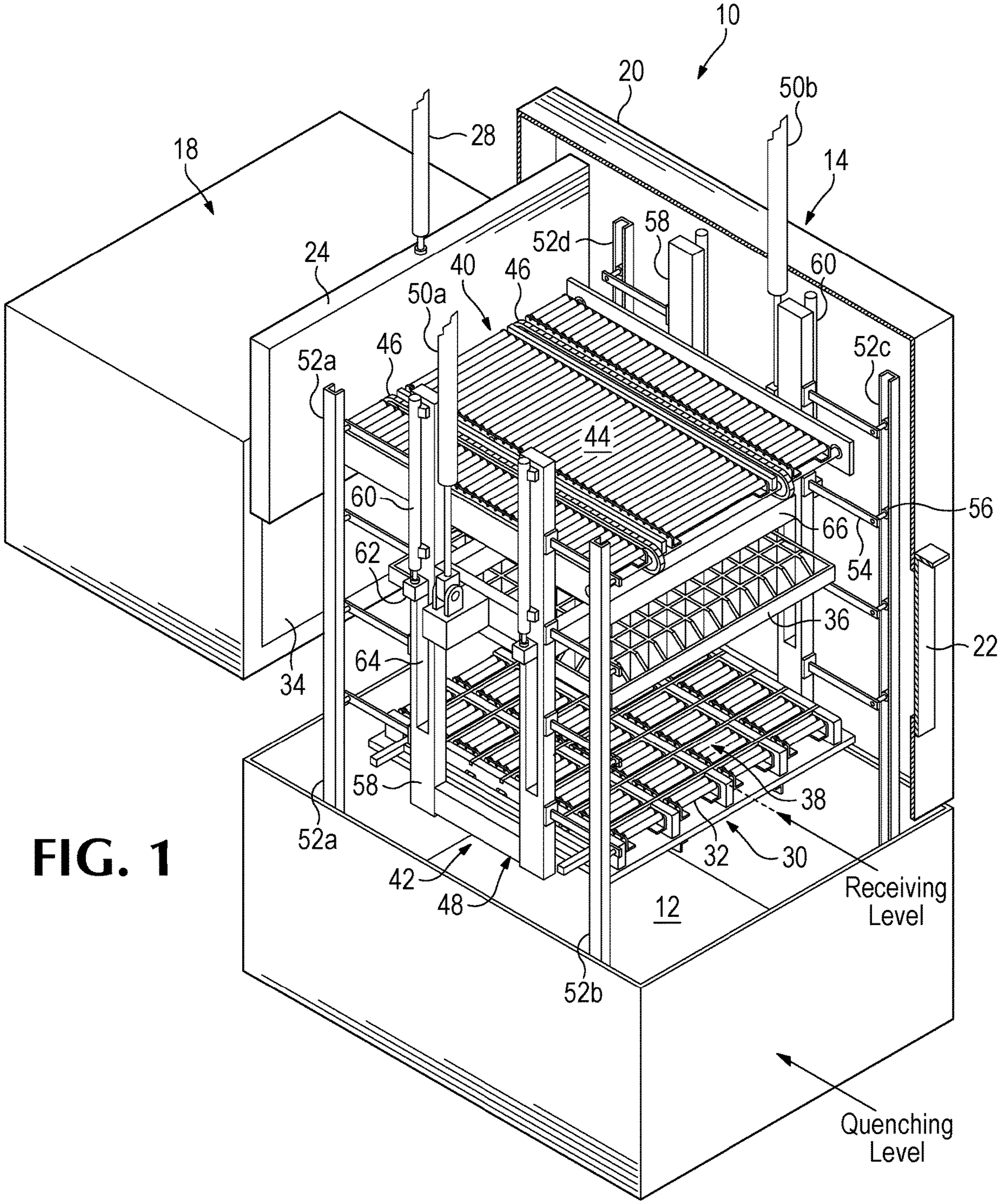
FIG. 1 is a perspective view of a workpiece hardening system implemented according to teachings of the invention.

FIG. 1 illustrates an apparatus 10 for quenching a heated workpiece in a quenching bath 12 using processes described in further detail below. The apparatus 10 includes a central structure 14 interposed between an upstream conveyor 16 (FIG. 4) and a furnace 18. This central structure 14 is responsible for receiving untreated workpieces from a feed station upstream (not shown), conveying the untreated workpiece to furnace 18 for heat treatment using methods described further below, receiving the heated workpiece from the furnace after heat treatment, mechanically clamping the heated workpiece, lowering the now-clamped heated workpiece into the quenching bath for a certain prescribed time, raising the now-quenched workpiece, and conveying the quenched workpiece upstream where it can be dismounted for use in a molding process.

Central structure 14 is generally enclosed in a vestibule 20 that includes an upstream door 22 allowing access to the vestibule from upstream conveyor 16 and a downstream door 24 allowing access to and from furnace 18. Doors 22, 24 are lifted via cylinders 26 (FIG. 4) and 28, respectively, and operated manually or by automated means under programmed control.

A lower conveyor 30 is enclosed within vestibule 20 and includes an array of rollers 32 forming a lower conveyor surface that is configured to laterally receive and transfer a workpiece thereupon. FIG. 1 (and FIG. 4) illustrates the lower conveyor 30 at a receiving level that is even with the furnace floor 34, but it is understood that the vertical height of the lower conveyor can be adjusted using the elevator assembly 42 described further below. An upper anvil 36 is positioned above the rollers 32 of the lower conveyor support surface and forms a space 38 for receiving the workpiece therebetween.

Figure 7:
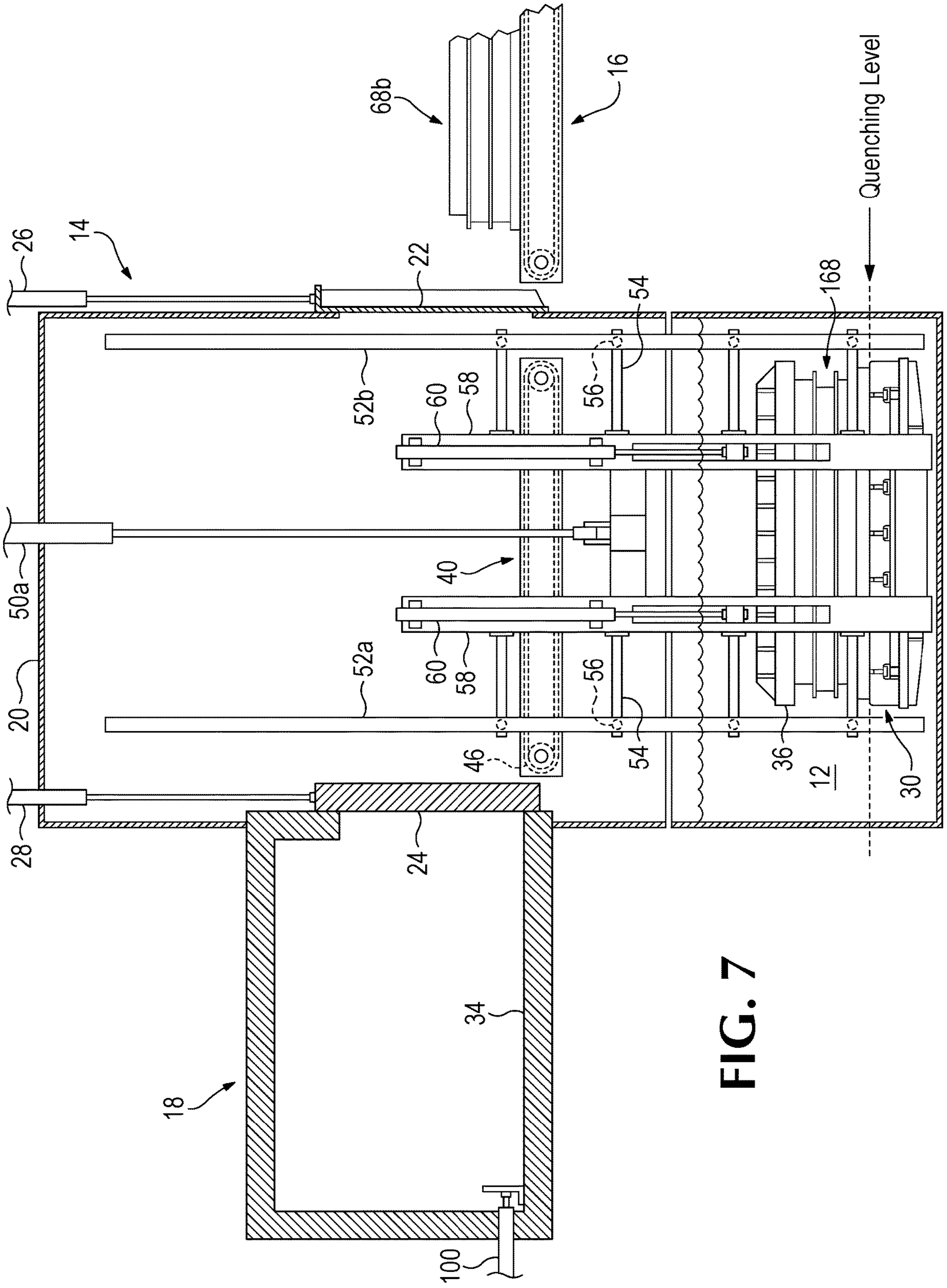

An upper conveyor 40 is shown in a raised position above the upper anvil 36 and moves vertically in common with lower conveyor 30 via an elevator assembly 42. Upper conveyor 40 includes an array of rollers 44 driven in an upstream or downstream direction via a belt drive 46. The elevator assembly 42 includes a framework 48 coupled to a plurality of elevator assembly cylinders 50*a*, 50*b* for lifting and lowering the framework 48 and attached lower and upper conveyors 30, 40 in common between a raised position where the lower conveyor 30 is at the Receiving Level as shown in FIG. 1, and a lowered position when the lower conveyor 30 (and workpiece) is at a Quenching Level as shown in FIG. 7. Framework 48 is guided vertically within tracks 52*a,b,c,d* positioned at each of the four corners of the vestibule 20 via an array of struts 54 and wheels 56 coupled along the length of the vertical supports 58 of the framework.

A set of upper anvil cylinders, by example cylinder 60, operate to raise and lower upper anvil 36 independently of elevator cylinders 50*a*, 50*b*. Cylinders 60 attach to respective blocks 62 that are received through slots 64 formed vertically within the vertical supports 58 of the elevator framework 48. These blocks 62 form the terminal ends of braces 66 that pass over and attach to the top of upper anvil 36. Extending cylinders 60 causes the blocks 62 to move downward within slots 64 and thus provides a downward force on the braces 66 and attached anvil 36 to effect clamping as described further below.

Figure 2:
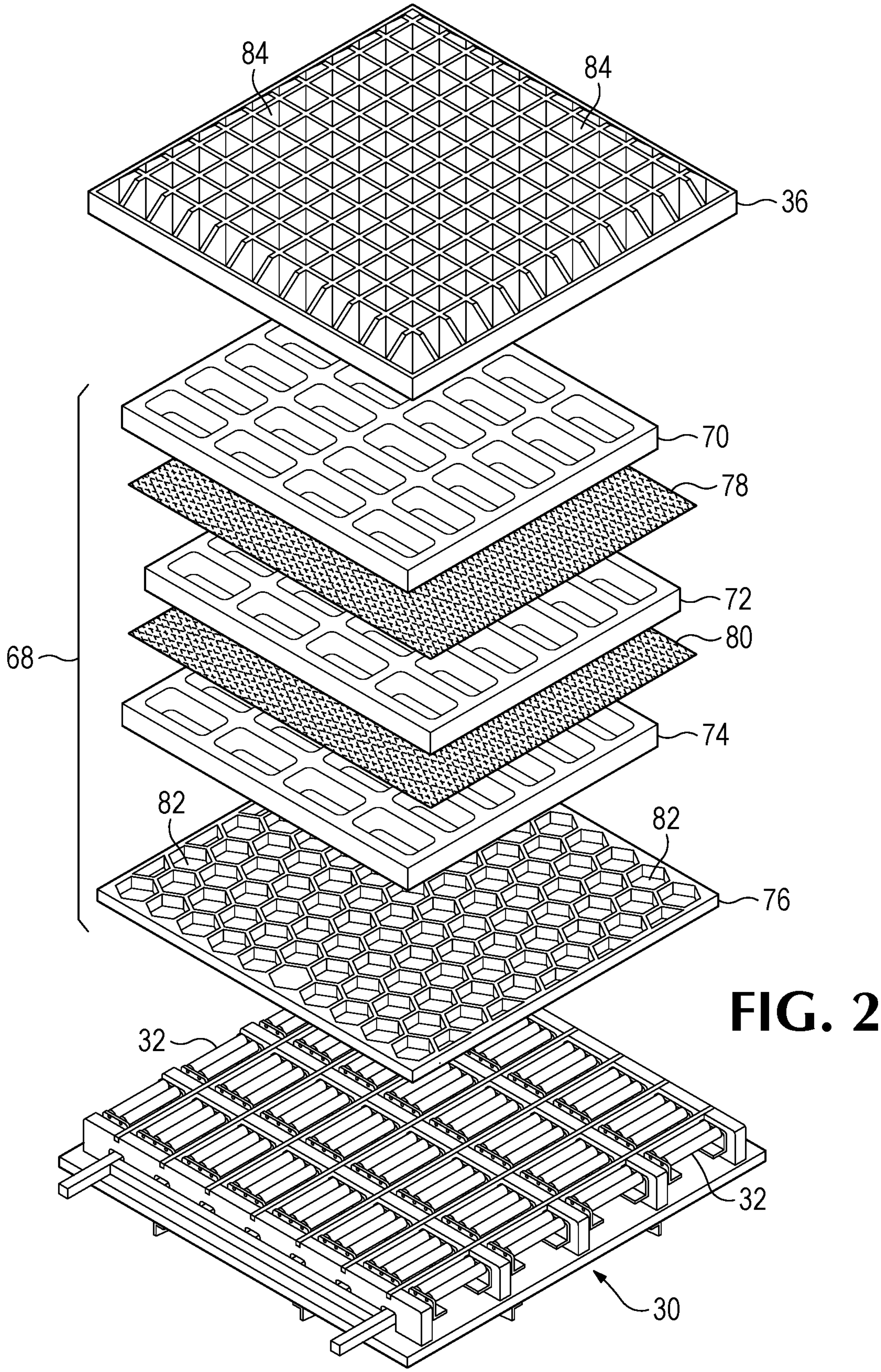
FIG. 2 is a perspective exploded view of the multiple layers of a workpiece with respect to the upper and lower anvils of the clamping apparatus.

FIG. 2 illustrates in exploded view a workpiece 68 disposed between the upper anvil 36 and lower conveyor 30. The workpiece 68 in this embodiment preferably includes a plurality of mold grids 70, 72, 74 arranged in a stack on a tray 76. The mold grids are preferably separated from one another within the stack by a grate, e.g. grates 78, 80, that are preferably formed of round cross section metal wire. This structure of grate wires minimize contact with the flat top and bottom surfaces of the mold grids and are formed into a woven pattern with spaces between the weave to allow the quenching fluid to easily pass through the grates and thus facilitate contact of the quenching fluid (preferably oil) with these various flat surfaces of the mold grids 70, 72, 74. Similarly, the tray 76 and upper anvil 36 have perforations therethrough—e.g. perforations 82 and 84, respectively—to enhance the circulation of liquid from the quenching bath 12 to contacted surfaces of the heated workpiece 68. This stacking of mold grids allows the proper heat treating of multiple mold grids at once to improve process throughput.

Figures 3A, 3B:
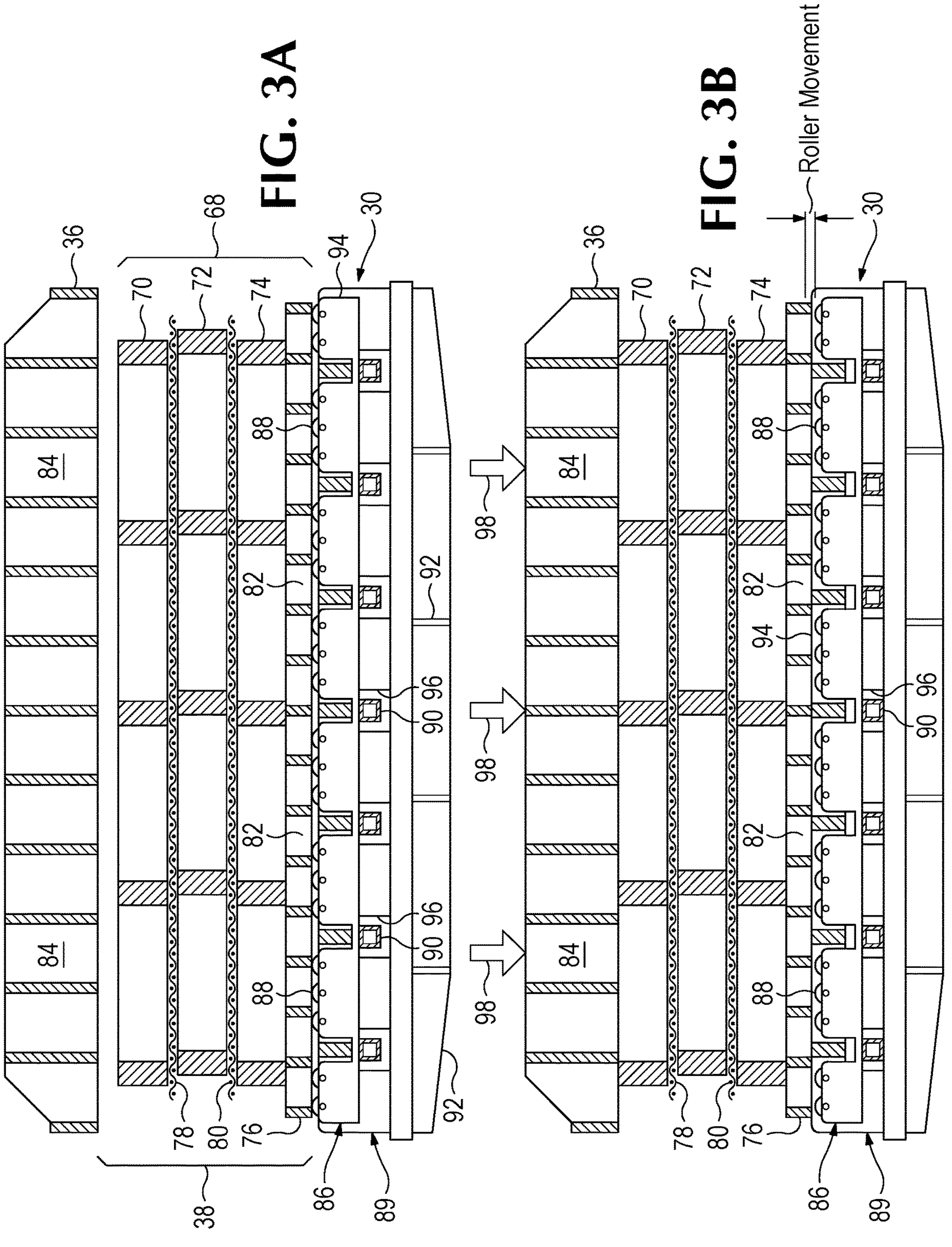
FIGS. 3A and 3B are side elevation section views of the workpiece positioned between the upper and lower anvils in both unclamped and clamped positions, respectively.

FIGS. 3A and 3B illustrate the workpiece 68 in unclamped and clamped positions, respectively. FIG. 3A shows the workpiece 68 received within the receiving space formed between the raised upper anvil 36 and the lower conveyor 30. The lower conveyor 30 includes an upper section 86 coupled to an array of rollers 88 and supported by a plurality of crossbeams 90. The rollers can be a heat resistant steel structure or a carbon composite material. The upper section 86 is nested within a lower section 90 that includes structural ribs 92 and a lower anvil surface 94. The crossbeams 90 fit within slots 96 formed within the sidewalls of the lower section 89 and are configured to be raised and lowered within those slots. In this way, the lower conveyor surface (e.g. the rollers 88) is configured to move between raised (e.g. FIG. 3A) and lowered (e.g. FIG. 3B) positions. In the raised position as shown in FIG. 3A, the rollers 88 are raised above the level of the lower anvil surface 94 so that the workpiece 68 can easily move laterally along and is supported by rollers 88. However, when clamping force 98 is applied, the upper section 86 with the rollers 88 is lowered so that a top surface of the rollers is at or below the lower anvil surface 94 at the top of the lower section 90 as shown in FIG. 3B. The entire assembly, including the lower conveyor, forms a clamped assembly. This lowering of the rollers is done to prevent undue force against and possible deformation of the rollers 88 during the clamping process. Downward force is instead created by the tray 76 resting against the lower anvil surface 94, which is structurally reinforced as via ribs 92 and thus less prone to deformation.

In preferred embodiment, the workpiece 68 layers are laterally offset as shown in FIGS. 3A and 3B so that the mold grid surfaces, openings, and supports are not completely vertically aligned with one another. This, then, enhances the contact and flow of the quenching bath with top and bottom surfaces of the heated workpiece by making such surfaces more exposed and not covered up by vertically adjacent or opposed surfaces.

Figure 4:
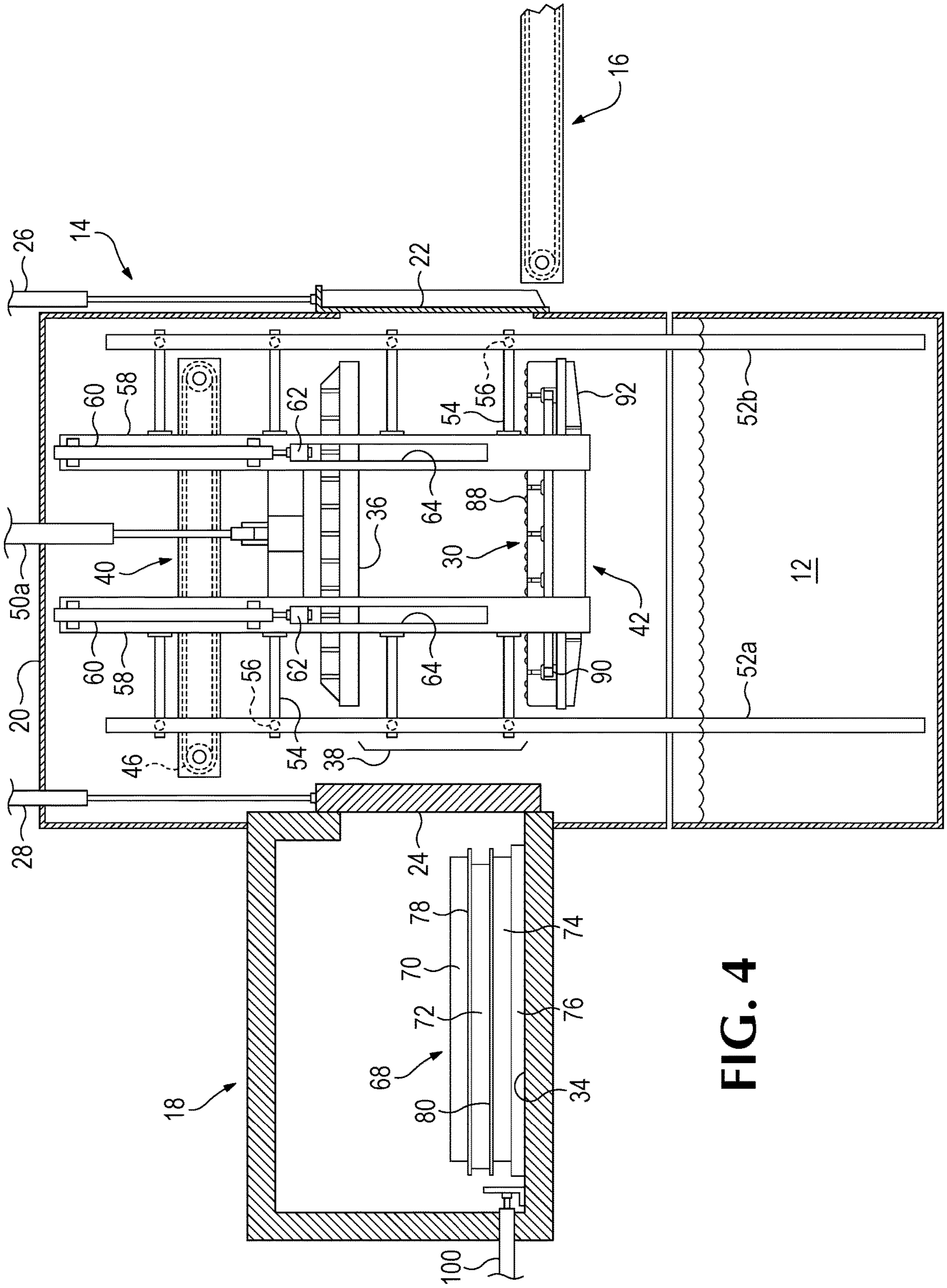
FIGS. 4-11 are side elevation views showing sequence steps for treating a workpiece using the system of FIG. 1.

FIG. 4 illustrates a step in the heat treating process according to teachings of the invention. While the process below describes use of a classic atmospheric furnace, it is understood that the described clamp quench process also works in a vacuum furnace setup or where a high carbon steel is simply heated up for the quench process. In the classic atmospheric furnace process, the workpiece 68 is placed within a furnace 18 and heated to approximately 1700° F. for 10+ hours, and more preferably between 12-13 hours, in an atmosphere enriched with carbon. After this heating step, the diffusion process is completed and the carbonized martensitic surface on the exposed steel surfaces of the mold grids, e.g. grid 70, is formed.

The molds can be heated upwards to 950° C. (1740° F.) and stay in the batch furnace between 10-14 hours before they are transferred to the vestibule at around 840° C. (1540° F.). The endothermic gas used in furnace 18 is preferably comprised of carbon monoxide, hydrogen and nitrogen with an enriching gas like natural gas. This endothermic gas is gradually enriched with carbon as the molds heat up from room temperature to the actual carburizing temperature. While the furnace is idling, the carbon potential is generally between 0.4-0.6%. The level of carbon potential depends upon the temperature of the furnace and its load. In most cases the operating temperature of the furnace is around 920° C. (1690° F.). The carbon potential is at about 1.15-1.2%. About 1 hour before the load is transferred to the vestibule, the system goes into the diffusion cycle by reducing the temperature to 840° C. (1540° F.) and lowering the carbon potential to about 0.6%. The pressure in the furnace during this process is ever so slightly above the surrounding atmosphere.

Figure 5:
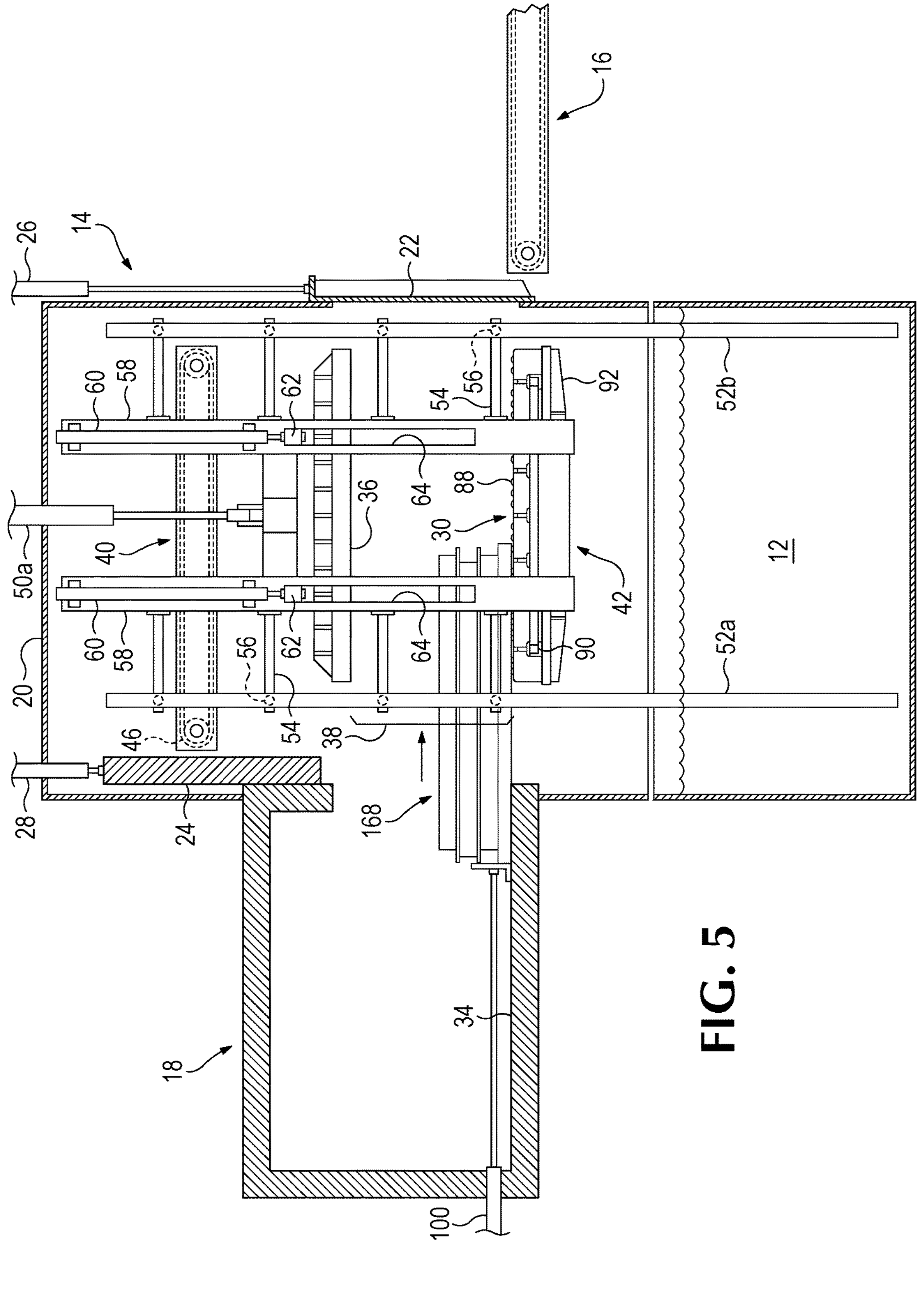

FIG. 5 illustrates the transfer process, where the furnace door 24 is opened via lifting cylinder 28 and the now-heated workpiece 168 (renumbered from workpiece 68 to illustrate its changed state) is pushed out via pusher 100 to the lower conveyor 30 positioned by the elevator assembly 42 at the receiving level. The heated workpiece 168 is thus positioned in the receiving space 38 between the upper anvil 36 and the lower conveyor 30 within the vestibule 20. The vestibule is preferably maintained at approximately the same pressure as the furnace and is "flooded" with nitrogen gas to avoid any unwanted combustion.

Figure 6:
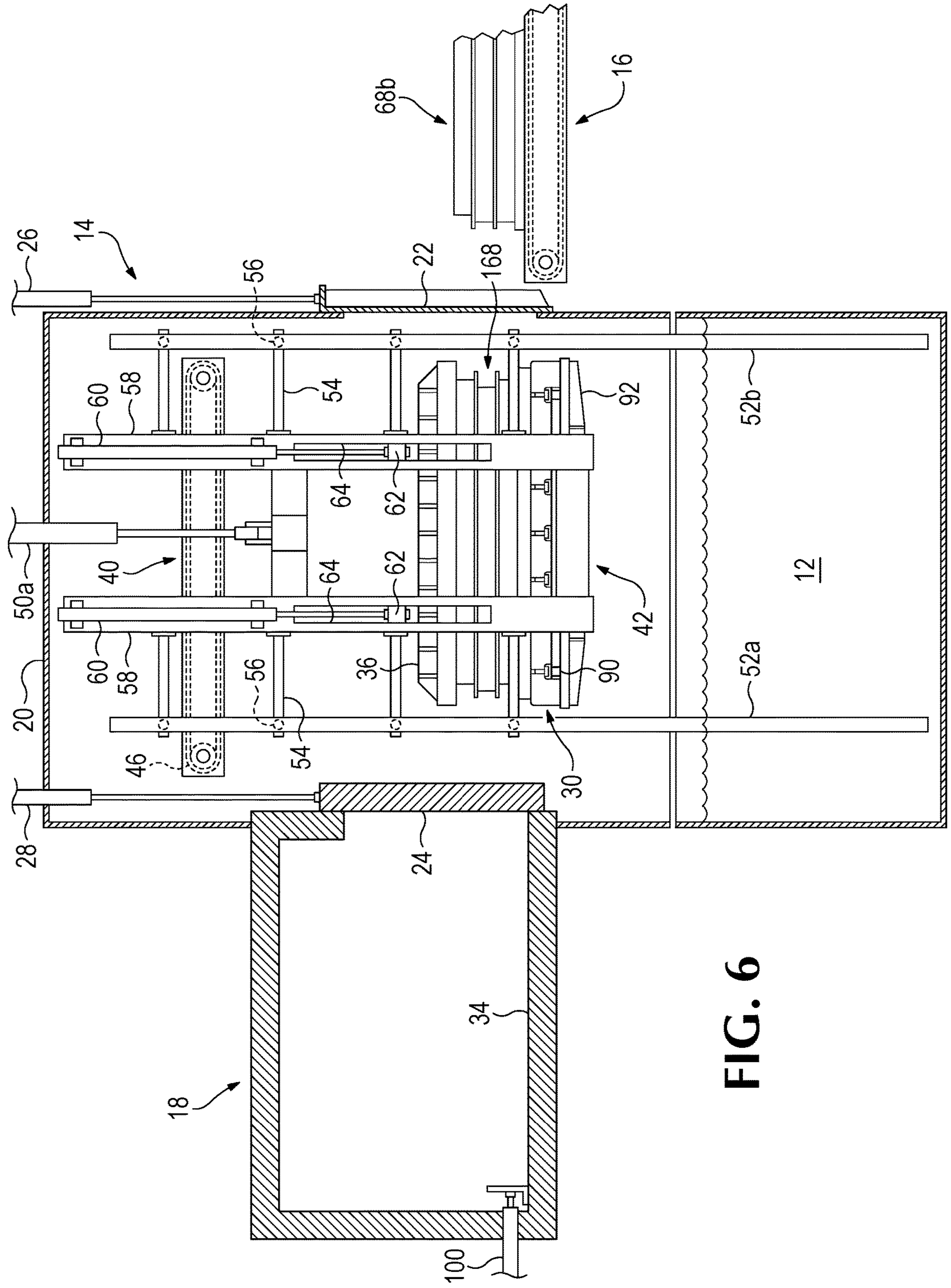

FIG. 6 illustrates the clamping process, where the received heated workpiece 168 rests completely on the lower conveyor 30 within the elevator assembly 42. The furnace door 24 is lowered via cylinders 28 to a closed position and the clamping cylinders 60 are activated to push blocks 62 down within slots 64 and thereby force the upper anvil 36 downward toward the lower conveyor 30. Crossbeams 90 within the upper section 86 of lower conveyor 30 are retracted to thereby lower the coupled rollers 88 to a lowered position that is at or lower than the top surface of the lower anvil 94. Clamping pressure is then applied between the upper anvil 36 and lower anvil 94 to maintain the heated workpiece 168 therebetween as a clamped assembly. The mechanical press lowers into contact with the top surface of mold grid 70 to thereby flatten out any unevenness in the workpiece 68 while the steel in the mold grids 70, 72, 74 are nearly fresh out of the furnace and, at about 1600° F., are still in a somewhat softened state. Clamping force is preferably approximately between 10 and 40 tons of force over the entire area of the upper anvil 36, and more preferably around 20 tons total. Meanwhile, a new workpiece **68*b* is staged on upstream conveyor 16 and ready for heat-treatment using the same process as for the original workpiece 68**.

Figure 8:
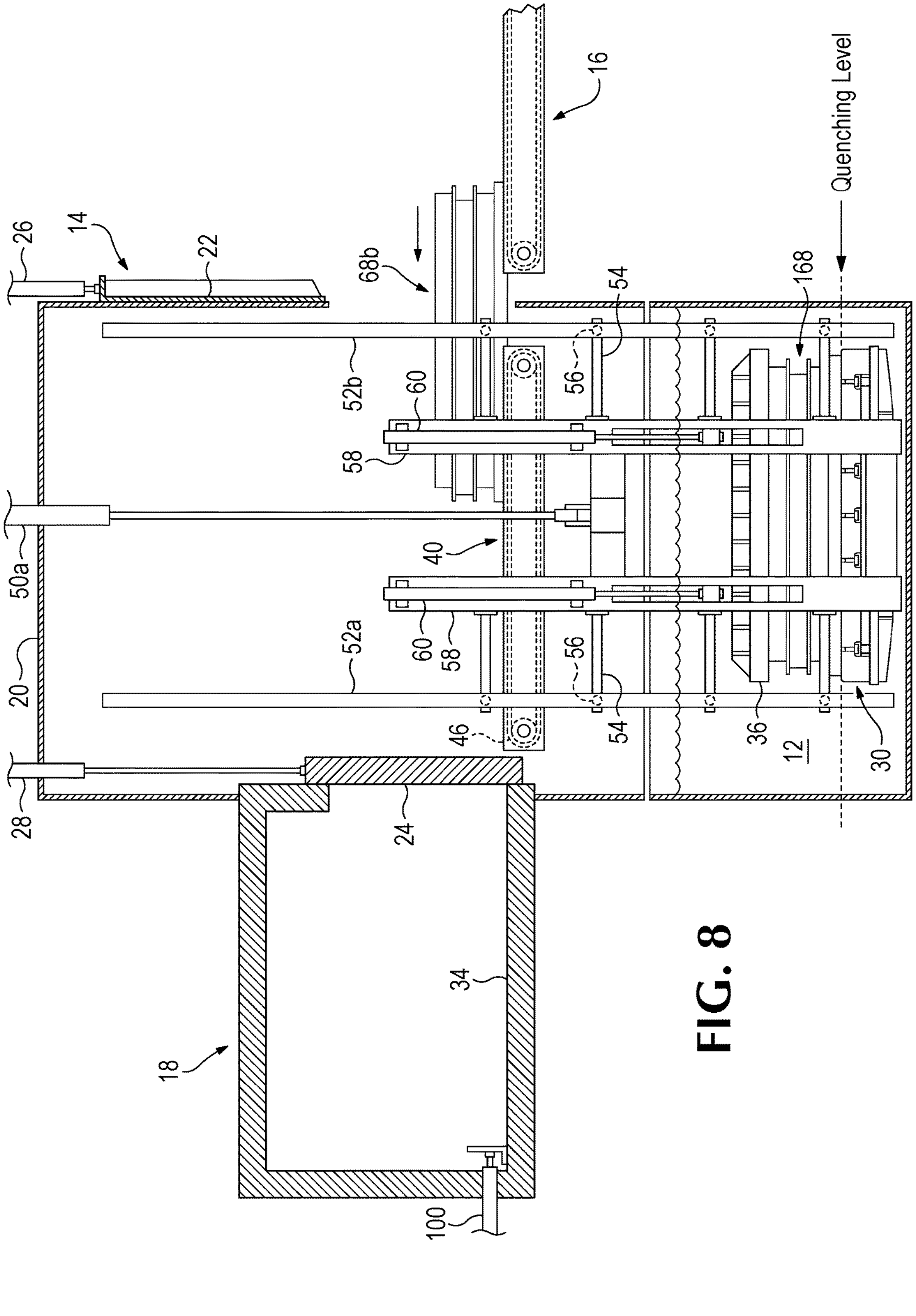
Figure 9:
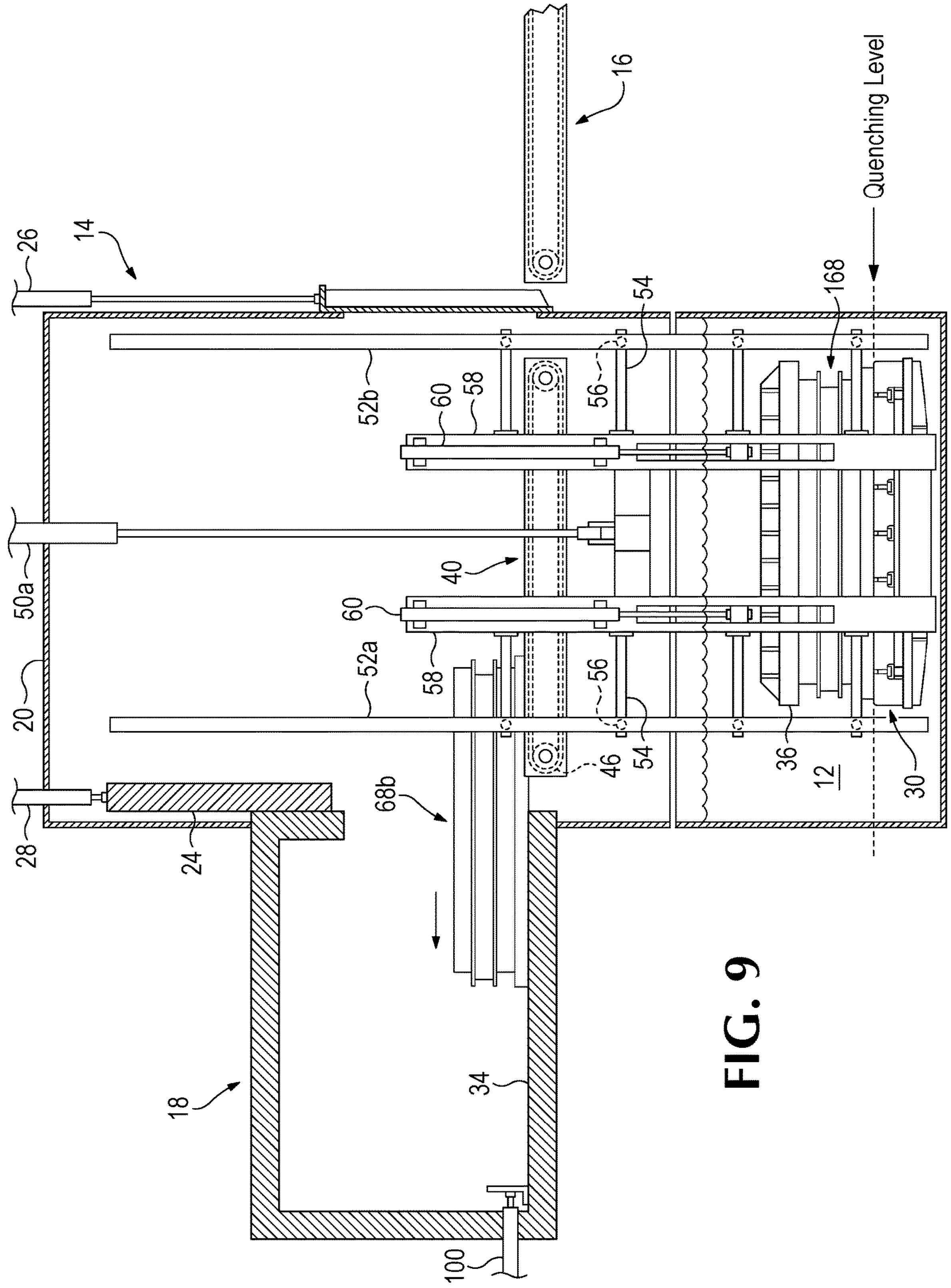

FIG. 7 illustrates the step of lowering the clamped assembly, including heated workpiece 168, into the oil bath 12 for quenching. Elevator cylinders **50*a*, 50*b* are activated and the elevator assembly 42 guided via tracks 52*a*-52*d* to a lowered position so that the lower conveyor 30 is at the quenching level within the quenching oil bath 12. Movement of the clamping cylinders 60 are synchronized with the elevator cylinders 50*a*, 50*b* so that clamping force is maintained by the upper anvil 36 while the lower conveyor is lowered into the quenching bath, where the positions of the piston rods are electronically monitored for a maximum misalignment of preferably approximately 0.1 mm or less. The mechanical press continues to apply force to the mold inserts during the quench process, where duration and pressure may be varied. The lower conveyor 30 and upper conveyor 40 are vertically spaced in fixed relation to one another such that, when the lower conveyor 30 is at the quenching level, the upper conveyor 40 is at the receiving level and even with the top surface of the upstream conveyor 16 and furnace floor 34. The new workpiece 68*b* resting on upstream conveyor 16 is then moved downstream onto the upper conveyor 40 as shown in FIG. 8 and thence laterally along the conveyor into the furnace 18 as shown in FIG. 9. The furnace door 24 is closed as shown in FIG. 10 and the new workpiece heated in the furnace 18 under the same process as with the original workpiece 68**.

Figure 10:
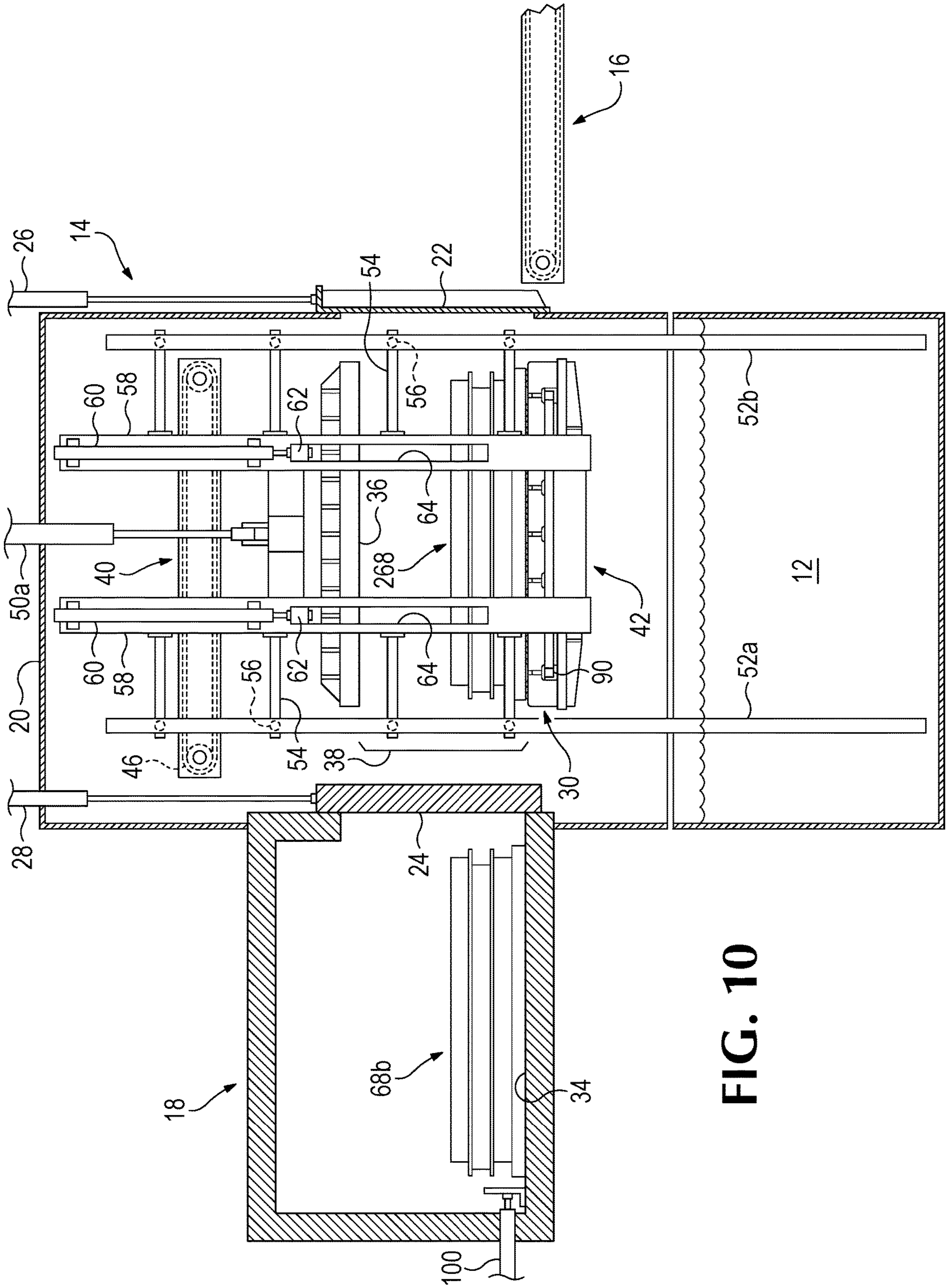
Figure 11:
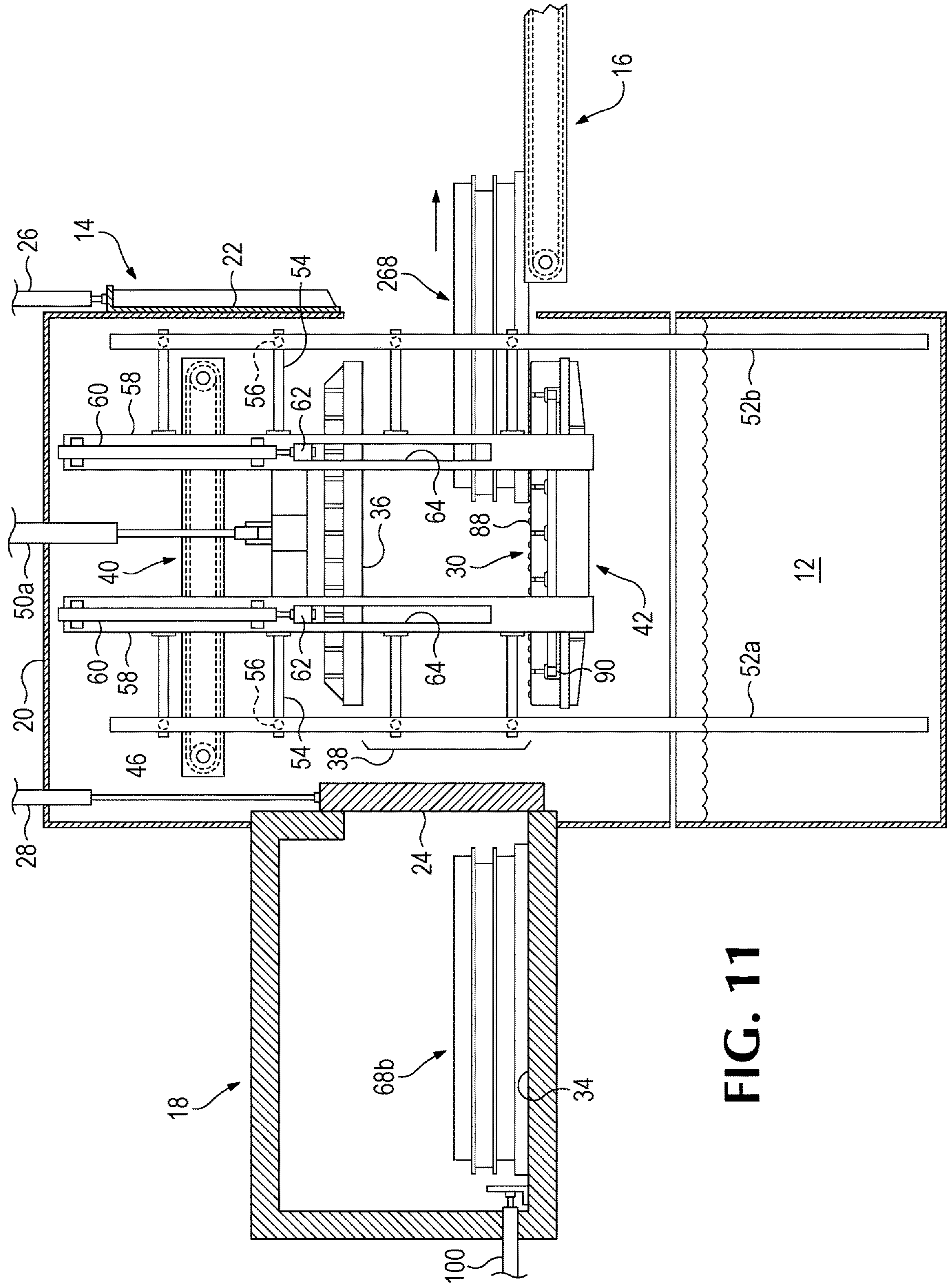

FIG. 10 illustrates the step of raising the now-quenched workpiece 268 from the oil bath 12 after approximately 35-40 minutes while the workpiece is under constant clamping pressure in order to maintain the mold grids in a planar, non-warped condition. Elevator cylinders **50*a*, 50*b* are activated and the elevator assembly 42 guided via tracks 52*a*-52*d* to a raised position so that the lower conveyor 30 is at the receiving level and even with rollers of the upstream conveyor 16. The clamping cylinders 60 are activated to pull blocks 62 upward within slots 64 and thereby lift the upper anvil 36 away from the now-quenched workpiece 268 (again, renumbered from heated workpiece 168 to show its changed state) so that it is no longer clamped. The mechanical press can retract as the load is being brought out of the quench tank or, alternately, can retract once the load is full raised from the quench tank. Crossbeams 90 within the upper section 86 of the lower conveyor 30 are extended upward to thereby raise the coupled lower rollers 88 to a raised position above the top surface of the lower anvil 94. The now-quenched workpiece 268 is then moved on the rollers 88 onto the upstream conveyor 16** whereupon the now-quenched mold grids may be dismounted and used for production.

The aforementioned process has several advantages. First, stresses in the mold insert are equalized during the hot state. Furthermore, the process limits or eliminates the number of hairline cracks due to overstressing the material during the transformation stage. No mechanical straightening, and no surface grinding, would thus be required. As a result, less plate thickness is required, since no allowance would be needed for grinding top and bottom surfaces of the insert. The process also offers better control since the current approach does have large flatness variations. Finally, the invention process results in a more consistent hardness of the mold grid.

Having described and illustrated the principles of the invention in a preferred embodiment thereof, it should be apparent that the invention can be modified in arrangement and detail without departing from such principles. Accordingly, we claim all modifications and variation coming within the spirit and scope of the following claims.

What is claimed is:

1. A method for treating a workpiece, the method comprising:

- moving a workpiece laterally along a conveyor assembly into a furnace for heating in a carbon-rich atmosphere to form a heated workpiece, the workpiece of a type comprising a plurality of mold grids arranged in vertical layers and spaced apart from one another by grates;
- receiving the heated workpiece from the furnace on a conveyor support surface of the conveyor assembly;
- lowering the conveyor support surface at or below a lower anvil surface on the conveyor assembly so that the heated workpiece is supported on the lower anvil surface;
- applying clamping pressure to the heated workpiece while the heated workpiece is on the conveyor assembly to form a clamped assembly by forcing an upper anvil against a top surface of the heated workpiece and clamping the heated workpiece between the upper anvil and lower anvil surface;

moving the clamped assembly, including at least a portion of the conveyor assembly, into a quenching bath until the heated workpiece is quenched; and laterally offsetting the vertical layers from one another so as to enhance the contact of the quenching bath with top and bottom surfaces of the heated workpiece.

2. The method of claim 1, wherein the conveyor assembly includes an upper conveyor and lower conveyor and the step for moving the workpiece includes moving the workpiece along an upper conveyor into the furnace.

3. The method of claim 2, wherein the step of receiving the heated workpiece includes receiving the heated workpiece from the furnace onto the lower conveyor.

4. The method of claim 3, wherein the clamped assembly includes the lower conveyor and wherein the step of moving the clamped assembly into the quenching bath includes lowering the clamped assembly into the quenching bath.

5. The method of claim 1, further including the steps of:

raising the clamped assembly from the quenching bath after the heated workpiece is quenched;

releasing the clamping pressure from the heated workpiece; and moving the heated workpiece laterally along the conveyor assembly to a dismount position.

6. A method for treating a workpiece, the method comprising:

laterally offsetting vertical layers of a plurality of mold grids from one another to form a workpiece;

moving the workpiece laterally along a conveyor assembly into a furnace for heating in a carbon-rich atmosphere to form a heated workpiece;

receiving the heated workpiece from the furnace on the conveyor assembly;

applying clamping pressure to the heated workpiece while the heated workpiece is on the conveyor assembly to form a clamped assembly; and moving the clamped assembly, including at least a portion of the conveyor assembly, into a quenching bath until the heated workpiece is quenched.

7. The method of claim 6, wherein the conveyor assembly includes an upper conveyor and lower conveyor and the step for moving the workpiece includes moving the workpiece along an upper conveyor into the furnace.

8. The method of claim 7, wherein the step of receiving the heated workpiece includes receiving the heated workpiece from the furnace onto the lower conveyor.

9. The method of claim 8, wherein the clamped assembly includes the lower conveyor and wherein the step of moving the clamped assembly into the quenching bath includes lowering the clamped assembly into the quenching bath.

10. The method of claim 6, further including the steps of:

raising the clamped assembly from the quenching bath after the heated workpiece is quenched;

releasing the clamping pressure from the heated workpiece; and moving the heated workpiece laterally along the conveyor assembly to a dismount position.

11. The method of claim 6, wherein the step of receiving the heated workpiece from the furnace on the conveyor assembly includes:

receiving the heated workpiece on a conveyor support surface of the conveyor assembly; and lowering the conveyor support surface at or below a lower anvil surface on the conveyor assembly so that the heated workpiece is supported on the lower anvil surface prior to the clamping step.

12. The method of claim 11, wherein the step of applying clamping pressure to the heated workpiece includes forcing an upper anvil against a top surface of the heated workpiece and clamping the heated workpiece between the upper anvil and lower anvil surface.

13. The method of claim 6, further including the step of interposing grates between each of the mold grids within the workpiece.

14. A method for treating a workpiece, the method comprising:

moving the workpiece laterally along a conveyor assembly into a furnace for heating in a carbon-rich atmosphere to form a heated workpiece, the workpiece of a type comprising a plurality of mold grids arranged in vertical layers;

interposing permeable grates between each of the mold grids within the workpiece so as to allow quenching fluid to pass through the grates and contact surfaces on adjacent mold grids;

laterally offsetting the vertical layers from one another so as to enhance the contact of the quenching fluid with top and bottom surfaces of the heated workpiece;

receiving the heated workpiece from the furnace on the conveyor assembly;

applying clamping pressure to the heated workpiece while the heated workpiece is on the conveyor assembly to form a clamped assembly; and moving the clamped assembly, including at least a portion of the conveyor assembly, into a quenching bath until the heated workpiece is quenched.

15. The method of claim 14, wherein the conveyor assembly includes an upper conveyor and lower conveyor and the step for moving the workpiece includes moving the workpiece along an upper conveyor into the furnace and wherein the step of receiving the heated workpiece includes receiving the heated workpiece from the furnace onto the lower conveyor.

16. The method of claim 15, wherein the clamped assembly includes the lower conveyor and wherein the step of moving the clamped assembly into the quenching bath includes lowering the clamped assembly into the quenching bath.

17. The method of claim 14, further including the steps of:

raising the clamped assembly from the quenching bath after the heated workpiece is quenched;

releasing the clamping pressure from the heated workpiece; and moving the heated workpiece laterally along the conveyor assembly to a dismount position.

18. The method of claim 14, wherein the step of receiving the heated workpiece from the furnace on the conveyor assembly includes:

receiving the heated workpiece on a conveyor support surface of the conveyor assembly; and lowering the conveyor support surface at or below a lower anvil surface on the conveyor assembly so that the heated workpiece is supported on the lower anvil surface prior to the clamping step.

19. The method of claim 18, wherein the step of applying clamping pressure to the heated workpiece includes forcing an upper anvil against a top surface of the heated workpiece and clamping the heated workpiece between the upper anvil and lower anvil surface.

* * * * *